(12) United States Patent
Schumacher

(10) Patent No.: US 11,439,939 B2
(45) Date of Patent: Sep. 13, 2022

(54) CONNECTION ARRANGEMENT FOR FIXING A LID OF AN AIR FILTER DEVICE OF A MOTOR VEHICLE TO A FILTER HOUSING AND TO A FILTER ELEMENT AND AN ASSOCIATED FILTER ELEMENT

(71) Applicant: DAIMLER BRAND & IP MANAGEMENT GMBH & CO. KG, Stuttgart (DE)

(72) Inventor: Eric Schumacher, Stuttgart (DE)

(73) Assignee: Daimler AG, Stuttgart (DE)

( * ) Notice: Subject to any disclaimer, the term of this patent is extended or adjusted under 35 U.S.C. 154(b) by 139 days.

(21) Appl. No.: 16/637,636

(22) PCT Filed: Aug. 6, 2018

(86) PCT No.: PCT/EP2018/071235
§ 371 (c)(1),
(2) Date: Feb. 7, 2020

(87) PCT Pub. No.: WO2019/030157
PCT Pub. Date: Feb. 14, 2019

(65) Prior Publication Data
US 2020/0269174 A1  Aug. 27, 2020

(30) Foreign Application Priority Data
Aug. 8, 2017 (DE) .................. 10 2017 007 497.6

(51) Int. Cl.
| | | |
|---|---|---|
| *B01D 46/00* | (2022.01) | |
| *B01D 46/52* | (2006.01) | |
| *B01D 46/42* | (2006.01) | |
| *B60H 3/06* | (2006.01) | |

(52) U.S. Cl.
CPC ..... *B01D 46/0006* (2013.01); *B01D 46/0004* (2013.01); *B01D 46/4227* (2013.01);
(Continued)

(58) Field of Classification Search
CPC ............ B01D 46/0006; B01D 46/0004; B01D 46/4227; B01D 46/521; B01D 2279/40;
(Continued)

(56) References Cited

U.S. PATENT DOCUMENTS

| | | | |
|---|---|---|---|
| 2004/0047711 A1* | 3/2004 | Cuva ....................... | F16B 21/02 |
| | | | 411/383 |
| 2018/0050296 A1* | 2/2018 | Fritzsching ........ | B01D 46/2414 |

FOREIGN PATENT DOCUMENTS

| | | |
|---|---|---|
| CN | 101835520 A | 9/2010 |
| CN | 106139753 A | 11/2016 |

(Continued)

OTHER PUBLICATIONS

PCT/EP2018/071235, International Search Report dated Nov. 29, 2018 (Two (2) pages).

(Continued)

*Primary Examiner* — Robert A Hopkins
*Assistant Examiner* — Qianping He
(74) *Attorney, Agent, or Firm* — Crowell & Moring LLP

(57) ABSTRACT

A connection arrangement for fixing a lid to a filter housing and to a filter element, by which an insertion opening in the filter housing can be closed, includes a holding element on the filter element and a locking element on the lid. The holding element can be fixed by a contact surface for contacting the locking element in a recess of the filter housing. The holding element has a latching geometry with which it can be latched in the recess of the filter housing. The locking element is a shaft with a bolt rod and a handle part. The shaft is guided through the lid such that the lid and the filter element in the latching position can, by the bolt rod and a contact surface formed as a ramp on the holding element, which engage with one another by turning the locking element, be spanned against each other.

8 Claims, 16 Drawing Sheets

(52) U.S. Cl.
CPC ......... *B01D 46/521* (2013.01); *B60H 3/0616* (2013.01); *B01D 2279/40* (2013.01); *B60H 2003/065* (2013.01)

(58) Field of Classification Search
CPC .......... B01D 46/0005; B01D 2265/029; B01D 2265/027; B01D 46/00; B01D 46/52; B01D 46/42; B60H 3/0616; B60H 2003/065; B60H 3/06; F02M 35/02416; F16H 21/44; A61L 2209/15; E05B 63/0013
USPC ...................................... 55/357; 70/166–168
See application file for complete search history.

(56) References Cited

FOREIGN PATENT DOCUMENTS

| DE | 10 2005 031 512 A1 | 1/2007 |
|---|---|---|
| DE | 10 2905 056 004 A1 | 6/2007 |
| DE | 10 2006 024 587 A1 | 11/2007 |
| DE | 20 2006 017 226 U1 | 4/2008 |
| DE | 10 2007 018 215 A1 | 10/2008 |
| DE | 20 2008 010 474 U1 | 1/2010 |
| DE | 19 2009 015 095 A1 | 10/2010 |
| DE | 10 2015 003 297 A1 | 9/2016 |
| DE | 10 2015 004 645 A1 | 10/2016 |
| EP | 1 306 120 A1 | 5/2003 |
| FR | 2 815 699 A1 | 4/2002 |
| WO | WO 2007/003390 A1 | 1/2007 |
| WO | WO 2016/165907 A1 | 10/2016 |

OTHER PUBLICATIONS

U.S. Patent Application, "Filter Element for an Air Filter of a Motor Vehicle and Air Filter", filed Feb. 7, 2020, Inventor: Eric Schumacher.
German-language German Office Action issued in German application No. 10 2017 007 497.6 dated Dec. 18, 2020 (Eight (8) pages).
Chinese Office Action issued in Chinese application No. 201880052066.1 dated May 28, 2021, with partial English translation (Thirteen (13) pages).

* cited by examiner

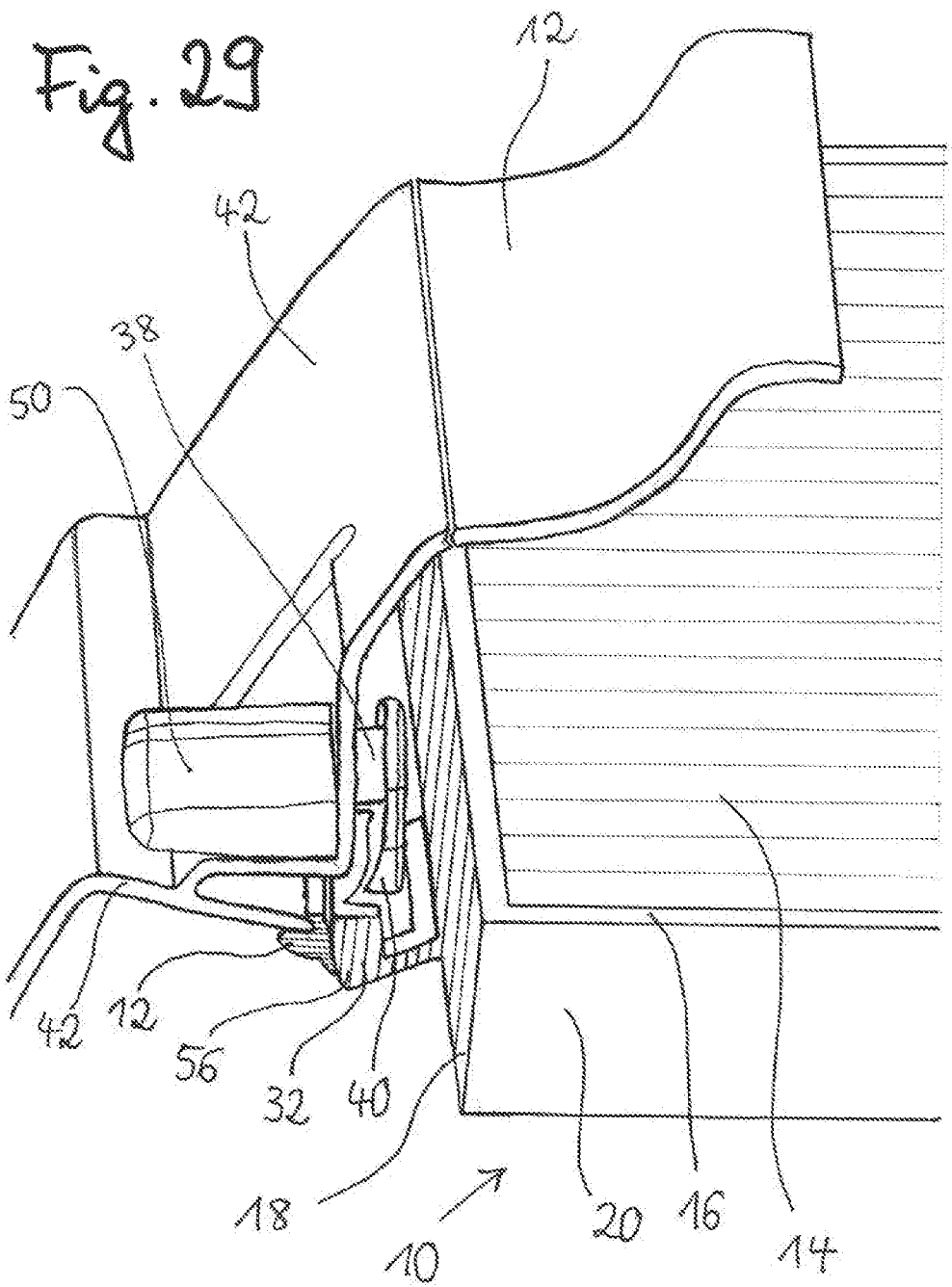

CONNECTION ARRANGEMENT FOR FIXING A LID OF AN AIR FILTER DEVICE OF A MOTOR VEHICLE TO A FILTER HOUSING AND TO A FILTER ELEMENT AND AN ASSOCIATED FILTER ELEMENT

BACKGROUND AND SUMMARY OF THE INVENTION

The invention relates to a connection arrangement for fixing a lid of an air filter device of a motor vehicle to a filter housing and to a filter element and to a filter element which is arranged exchangeably in the filter housing and can be introduced through an insertion opening in the filter housing, wherein the insertion opening can be closed by the lid, and wherein a holding element is mounted on the filter element, which can be fixed to the filter housing in a recess by means of a contact surface for contacting a locking element projecting from the lid.

DE 10 2005 056 004 A1 describes a filter arrangement for the air conditioning system of a motor vehicle having a filter insert which comprises a frame, wherein the frame encloses a filter material having folds. The filter material is connected to a lid which serves to close a slot opening when the filter insert is slotted into a receiver having the insertion opening. A sealing element for sealing the lid with respect to the slot opening is designed as an elastic sealing lip which projects towards the wall bordering the receiver.

DE 10 2015 004 645 A1 shows a filter element for gas filtration and a filter device having a filter housing. A holding element for fixing in a recess of the receiving filter housing is arranged on the filter element, wherein the holding element is arranged on a handle for holding and guiding the filter element. The receiving chamber of the filter device formed by the filter housing for the filter element is closed by means of a separate lid. The lid has a rod-shaped projection on its side facing towards the filter element, the projection, when the lid is mounted, protruding through a cavity in the handle of the holding element and coming into contact with an edge of the cavity, whereby the holding element is pressed in a recess of the filter housing.

The object of the present invention is to create a connection arrangement of the type mentioned above, by means of which a particularly reliable sealing of the filter housing on the insertion opening, which can be closed by the lid, and a secure seating of the lid can be achieved, and to provide a filter element which facilitates the production of such a connection arrangement.

The connection arrangement according to the invention for fixing a lid to a filter housing of an air filter device of a motor vehicle and—at the same time—to a filter element, whereby an insertion opening provided in the filter housing for the filter element can be closed with the lid, comprises at least one holding element on the filter element and a locking element on the lid, wherein the holding element can be fixed in a recess of the filter housing by means of a contact surface for contacting the locking element protruding from the lid, wherein, according to the invention, the holding element has a latching geometry, with which it can be latched in the recess of the filter housing designed as a latching niche, whereby the filter element can be fixed to the filter housing in a latching position, and the locking element is designed as a shaft having at least one bolt rod projecting from the shaft on one end and having a handle part on the other end for rotating the locking element, wherein the shaft is guided through the lid such that the lid and the filter element in the latching position can, by means of the at least one bolt rod and by means of at least one contact surface formed as a ramp on the holding element, which engage with each other by turning the locking element, be spanned against one another.

The air filter device can be designed in particular as an air filter of an air conditioning system or as a ventilation device of the motor vehicle. Furthermore, the air filter device can also be provided for an intake pipe of an internal combustion engine of the motor vehicle.

With the connection arrangement according to the invention, the insertion opening of a receiving chamber of an air filter device—in short, also air filter—can be reliably closed and sealed against the environment. At the same time, the lid is also securely fixed to the filter housing—in short, housing. The condition in which the lid is spanned via the connection arrangement closing and sealing the insertion opening against the filter housing is referred to as the operating position in the following. The at least one holding element has a latching geometry for example in the form of a latching tab, which can be latched in a recess in the filter housing, which is designed as a latching niche, whereby the filter element can be fixed in a latching position. In the latching position, the filter element is placed and fixed in the housing in such a way that the lid can be fastened without the filter element having to be kept in position. This fixing of the filter element in a self-holding position is particularly important when the filter element must be mounted "overhead" by an assembler, that is to say when the filter element is substantially slotted into the receiving chamber against gravity or upwards perpendicularly. The latching position of the filter element in the housing is simultaneously the mounting position, i.e., the position in which the lid can be mounted with the locking element. After the fixing in the latching position for the final fastening or mounting, the filter element no longer needs to be held in the receiving space of the air filter device manually or by means of an alternative temporary device. This facilitates the mounting of the lid.

The lid can also only be fixed for closing the insertion opening of the receiving space to the housing of the air filter when the at least one holding element or the filter element is moved into the latching position. In this way, it is reliably prevented that the air filter device can be put into operation without a built-in filter element. The connection of the elements occurs through spanning the locking element within the housing through the bolt rod which is guided along the ramp on the holding element; from the outside, the handle part creates an abutment against the lid by, in the operating position, it being brought into abutment against the lid directly with its underside facing towards the lid—or indirectly via a spacer.

A filter element having at least one holding element of a connection arrangement also belongs to the invention, wherein the at least one holding element is held to a frame which at least partially surrounds a filter material of the filter element.

The filter element according to the invention is provided with at least one holding element, as described above in relation to the connection arrangement according to the invention. According to the invention, the contact surface on the at least one holding element is formed as at least one ramp, via which the lid can be brought into an operating position sealingly on the insertion opening by a bolt rod which protrudes on a shaft of the locking element, the shaft being guided through the lid and rotatable on a handle part, by the bolt rod being guided along the ramp. Here, the holding element is fixed to a frame which at least partially encloses the filter material of the filter element.

The frame or the enclosure can be formed, for example, in the form of several walls which surround the filter material. If the filter element has been inserted into the receiving chamber of the filter housing in the introduction direction, the at least one holding element, which is found on the frame or on a wall of the filter element, can be received in the latching niche of the housing with its latching geometry in a direction perpendicular—or transverse—to the slotting direction of the filter element, whereby the filter element is then in a self-affixing latching position. In the latching position, the holding element serves then—by means of its latching geometry staked against a locking geometry of the housing, formed by the latching niche—to fix the locking element. By means of the locking element, the lid for closing the insertion opening of the receiving chamber can be fixed to the filter housing, wherein the handle part of the locking element in the operating positions of the connection arrangement is then directly or indirectly supported on the lid, for example.

In an advantageous embodiment of the filter element according to the invention, the at least one ramp on the holding element is designed as a three-dimensional hump. In this way, it is possible to guide a bolt rod that is inwardly curved—that is to say, curved in the direction of the handle part of the locking element—or tapering diagonally in relation to the handle part over the contact surface formed as a corresponding hump geometry—for example as a cut-out of a spherical geometry or a conical geometry—or over a ramp of the holding element. In this way, the bolt rod in the operating position is fixed to the contact surface not only in the direction of the tensile force exerted against the lid, but it is additionally secured in a further direction which offers a particular reliability against impact.

A further advantageous embodiment provides that the at least one holding element has a passage opening for guiding the locking element through, wherein the at least one ramp is formed on the back side of the passage opening. This design allows the elements of the locking element—handle element, shaft and control rod—and the contact surface of the holding element in relation to the force exerted in the fastening position to come to rest in almost the same direction. In this way, a particularly torsion-resistant connection is enabled. In an embodiment of the holding element having two helically point-symmetrical ramps behind the passage opening in connection with two bolt rods projecting from the shaft of the locking element in the opposite direction, the elements of the locking element together with the contact surface of the holding element even come to rest in a straight direction with respect to force. In this way, a tilting of the locking element on the lid is prevented as far as possible.

According to a further expedient embodiment, the at least one holding element has an abutment for securing the end position of the bolt rod in connection with the at least one ramp. In this way, the at least one bolt rod formed on the locking element can be brought into contact with the abutment by rotating the shaft of the locking element, whereby haptic feedback to the assembler relating to the attachment reaching a defined end position takes place. In this way, it is ensured that the lid is tightened in the operating position by a defined tensile force, defined by the height of the ramp. An overtightening of the locking element is also avoided as a result of the abutment.

In a further advantageous embodiment, the at least one holding element is held to the frame by means of a flexible connecting bar. In this way, the at least one holding element can be brought into the latching position in the latching niche of the filter housing by means of an elastic deformation of the connecting bar as well as vice-versa out of the latching position back into a dismounting position. As a result of the flexibility of the connecting bar, the holding element can be reliably moved back and forth between the one position and the other. The bar can also be designed resiliently in terms of its flexibility in such a way that the holding element which is found within automatically latches into the latching niche after the complete slotting-in of the filter element into the filter housing.

In an alternative or additional embodiment, the frame of the filter element can have an elastic front wall which can be deformed from an extended shape into a compressed shape. Here, the front wall is the part of the frame which is facing towards the insertion opening in the inserted state of the filter element. By deforming the front wall, the at least one holding element, which is, for example, attached to a side wall of the filter element, can advantageously be moved, even when the holding element itself is fixed inflexibly or rigidly to the frame. In this way, the holding element or its latching geometry can also—or on its own—be brought both into the latching position by compressing or pulling apart the flexible front wall and vice-versa out of the latching position back into a dismounting position.

A further advantage of the elastic or deformable front wall of the filter element is that a radius, along which the latching geometry of the holding element can be moved when latching or unlatching, is very large in comparison to an embodiment with a flexible bar on the frame, since here the radius corresponds to the entire length of a side wall. In this way, the curvature for latching or unlatching the latching geometry of the holding element become considerably flatter, as with a solution with shorter bars. This is accompanied by a simplification of the constructive demands of the production of the latching niche on side of the housing, whose locking geometry must then have a less acute angle in order to ensure a precise fit between latching tab and latching niche which is crucial for the secure seating of the filter element in the fixing latching position. It is however conceivable to attach a bar to the end of a side wall opposite to the insertion opening and thus to achieve a large range of movement for the holding element or the holding geometry, yet this would be detrimental to the stability of the arrangement and would complicate the construction of the filter housing in other places.

According to a preferred development, it is provided that the filter element has at least one actuating element, wherein, by exerting a pressure against the at least one actuating element, the at least one holding element can be moved out of the latching position into a demounting position. For example, the actuating element can be designed as a grip lug or grip plate on a side of the filter element facing towards the slot opening, which pressure can be exerted against with a finger such that the holding element or its latching geometry can be easily moved out of the latching position. The actuating element can, for example, be fixed directly on the front wall of the filter element or also on the holding element.

In order to remove the filter element from the receiving chamber, the at least one holding element is to initially be moved into the demounting position against the direction in which it was moved to achieve the latching position, but still substantially perpendicularly or transversely to the insertion direction of the filter element. So long as the at least one holding element is not moved into the demounting position, a removal of the filter element from the receiving chamber is also prevented. If the holding element or its latching geometry is no longer in contact with the locking geometry or latching niche on side of the filter housing, the filter element can be easily removed from the receiving chamber of the air filter device.

Vice-versa, it can also be provided that by pressing against the at least one actuating element, the at least one holding element can be moved out of an intermediate position, which the at least one holding element assumes when the filter element in the receiving chamber has achieved an installation position, into the latching position. For this purpose, the holding element can, for example, be pressed transversely or perpendicularly to the slot direction of the filter element in the direction of the latching niche. Correspondingly, when the filter element needs to be removed from the receiving chamber, the at least one holding element is pressed in the opposite direction—in the direction of the filter element—this time by pressing against the at least one actuating element. The at least one actuating element can thus serve as a latching or unlatching lug for the fixing of the filter element and for the demounting of the filter element.

The advantages described for the connection arrangement according to the invention also apply to the filter element according to the invention and its described embodiments and vice versa.

Further advantages, features and details of the invention arise from the following description of preferred exemplary embodiments as well as with the aid of the drawings. The features and feature combinations mentioned in the description above as well as the features and feature combinations mentioned below in the description of the Figures and/or shown solely in the Figures are applicable not only in the respectively specified combination, but also in other combinations or on their own, without exceeding the scope of the invention.

BRIEF DESCRIPTION OF THE DRAWINGS

FIG. 29 shows a segmental, partially cross-sectional view of a connection arrangement having the filter element according to FIG. 26, the locking element according to FIG. 28 and a filter housing lid.

DETAILED DESCRIPTION OF THE DRAWINGS

Figure 1:
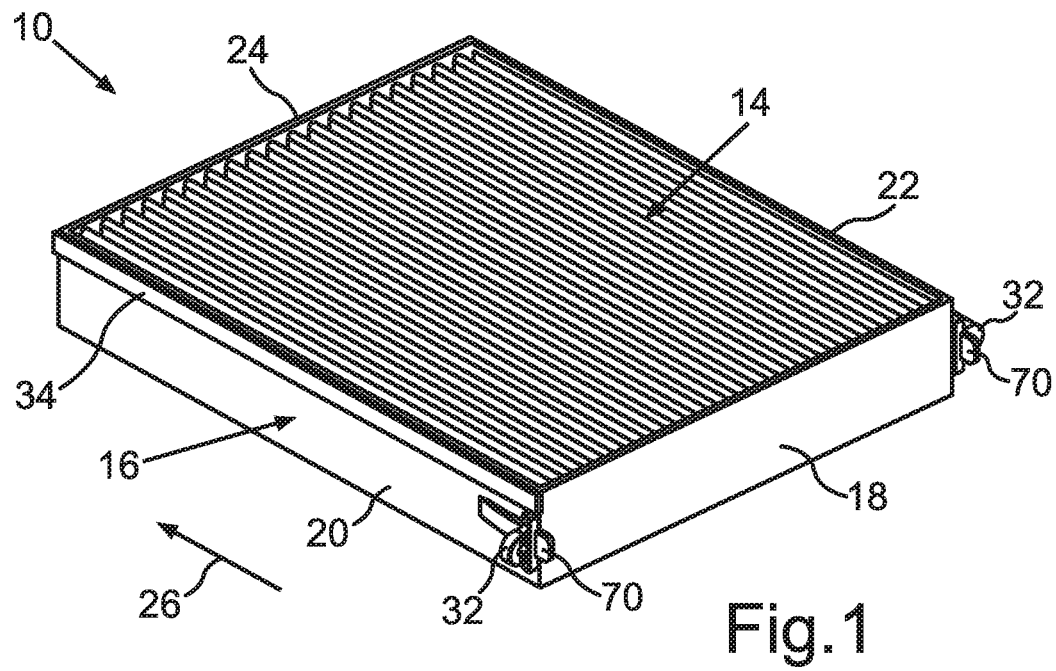
FIG. 1 is a perspective view of a filter element for an air filter of an air conditioning system of a motor vehicle, wherein flexible holding elements are arranged on side walls of a frame of the filter element.

In FIG. 1, a filter element 10 is shown perspectively, as it is provided for installation into a housing 12 (see FIG. 4) of an air filter of, for example, an air conditioning system of a motor vehicle. A filter material 14 of the filter element 10 is presently designed, for example, as a fluted filter. The filter material 14 is surrounded peripherally by a frame 16 which comprises of a frontal front wall 18, adjacent side walls 20, 22 and a rearward end wall 24.

The side walls 20, 22 extend in an insertion direction 26 which is shown in FIG. 1 by an arrow. In this insertion direction 26, the filter element 10 can be introduced into or slotted into a receiving chamber 28 which is provided by the filter housing 12 (see FIG. 4). In particular when viewed in the insertion direction 26, in FIG. 1 the wall nearest to the observer is the front wall 18 of the filter element 10 and the wall further away from the observer is the rearward end wall 24 of the filter element 10.

Figure 2:
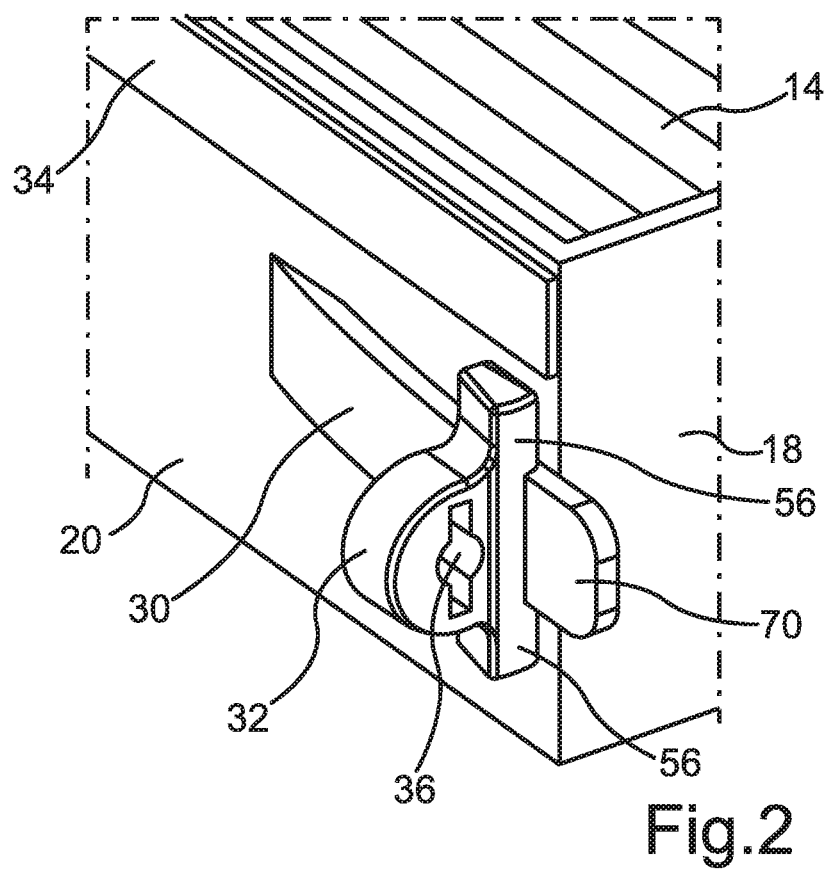
FIG. 2 shows one of the side walls of the frame with the holding element according to FIG. 1 in an enlarged detailed view.

In the variant of the filter element 10 according to FIG. 1, a holding element 32 is connected to the respective side wall 20, 22 via a flexible bar 30. The flexible bar 30 extends substantially along the respective side wall 20, 22 to the front wall 18. Above the bar 30, a strip-shaped sealing element 34 is arranged on the respective side wall 20, 22 as well as on the rearward end wall 24. It is clear from FIG. 2 that the holding element 32 has a passage opening 36 in which a shaft 38 having the bolt rods 40 arranged on the shaft 38 can be inserted (see FIG. 8).

Figure 4:
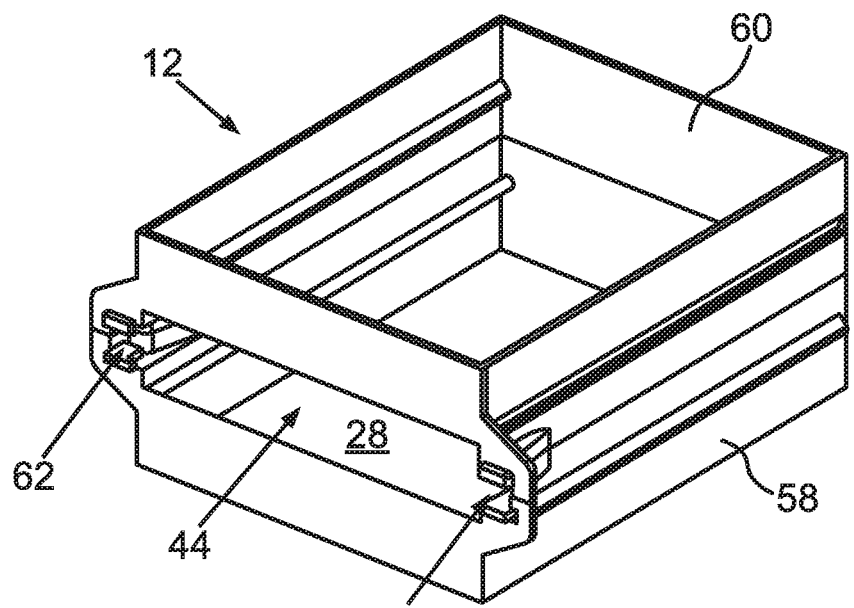
FIG. 4 is a perspective view of a housing of the air filter, by means of which a receiving chamber for the filter element according to FIG. 1 is provided.

This shaft 38 having the bolt rods 40 is a component of a locking arrangement, by means of which a lid 42 (see FIG. 7 and FIG. 8) can be fixed to the filter housing 12 (see FIG. 4). By means of the lid 42, an insertion opening 44 of the receiving chamber 28 can be sealingly closed (see FIG. 4). The two bolt rods 40 extend perpendicularly from the shaft 38. Correspondingly, the passage opening 36 has a geometry corresponding to the cross-section of the shaft 38 and the bolt rods 40.

Figure 3:
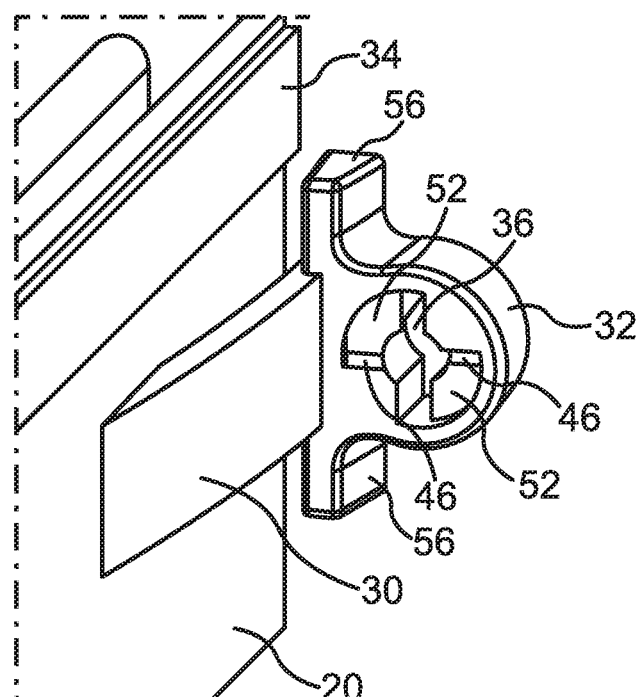
FIG. 3 is a further perspective detailed view of the holding element according to FIG. 2.

From the rear view of the holding element 32 according to FIG. 3, it is clear that respective abutments 46 for the bolt rods 40 are formed on the holding element 32. The abutments 46 facilitate a designed operating position. In order to bring the bolt rods 40 into contact with the abutments 46, locking elements 48 are formed, rotated on a handle part 50 as shown in duplicate in FIG. 7. The handle parts shown here 50 have two wings each.

The turning on the handle part 50 of the locking element 48 effectuates the turning of the shaft 38 and, together with this, the bolt rods 40 are turned around a longitudinal axis of the shaft 38 along the ramps 52 which are formed on the rear side of the holding element 32 to abut on the passage opening 36, whereby the bolt rods 40 are spanned against the holding element 32 and the wings of the handle part 50 on their underside against the lid 42. Since the bolt rods 40 come into contact with the abutments 46, a haptic feedback occurs to say that the locking process is completed or that the locking arrangement is in the defined operating position.

Via the height of the ramps 52, the tensile force with which the lid 42 is pulled against the housing 12 can be adjusted. The force against the lid 42 can but must not necessarily occur directly through the handle part 50. Between the lid 42 and handle 52, a disc-shaped or a sleeve-shaped spacer or similar, surrounding or enclosing the shaft, could be slotted in for supporting the lid 42.

By means of the ramps 52, a spanning geometry is provided in order bring the lid 42 into sealed abutment with the housing 12. The span geometries of the holding elements 32 which can be subject to wear are presently exchanged together with the filter element 10, that is to say together with the exchange unit.

Figure 8:
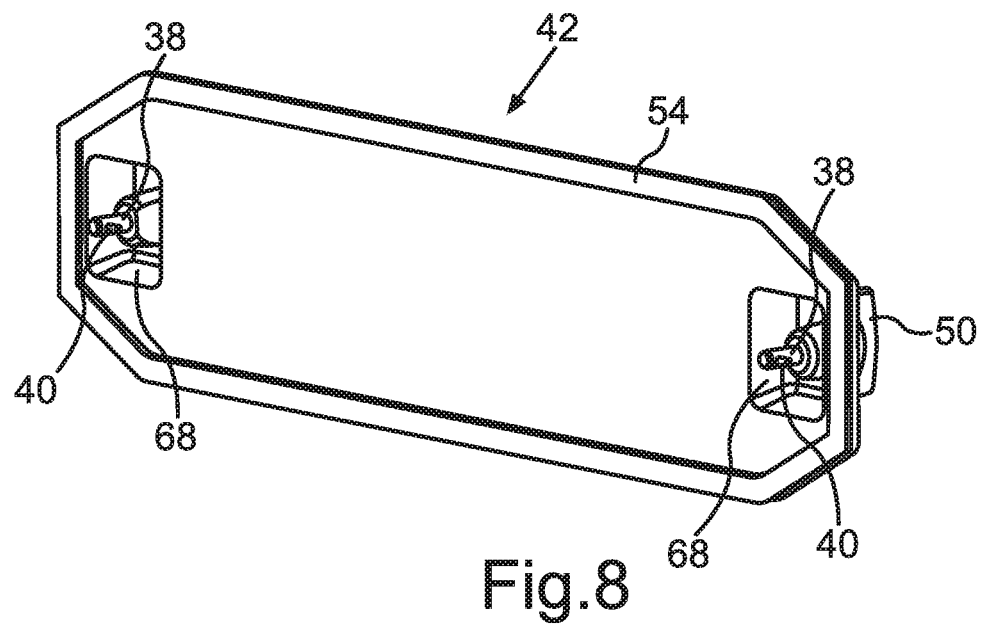
FIG. 8 shows the lid according to FIG. 7 in a further perspective view.

Furthermore, on the side of the lid 42 which is facing towards the filter housing 12, a peripheral, also strip-shaped seal 54 is arranged (see FIG. 8). Furthermore, the respective holding element 32 has a latching geometry 56, here in the form of latching tabs, which are formed integrally with the holding element (see FIG. 2).

Figure 5:
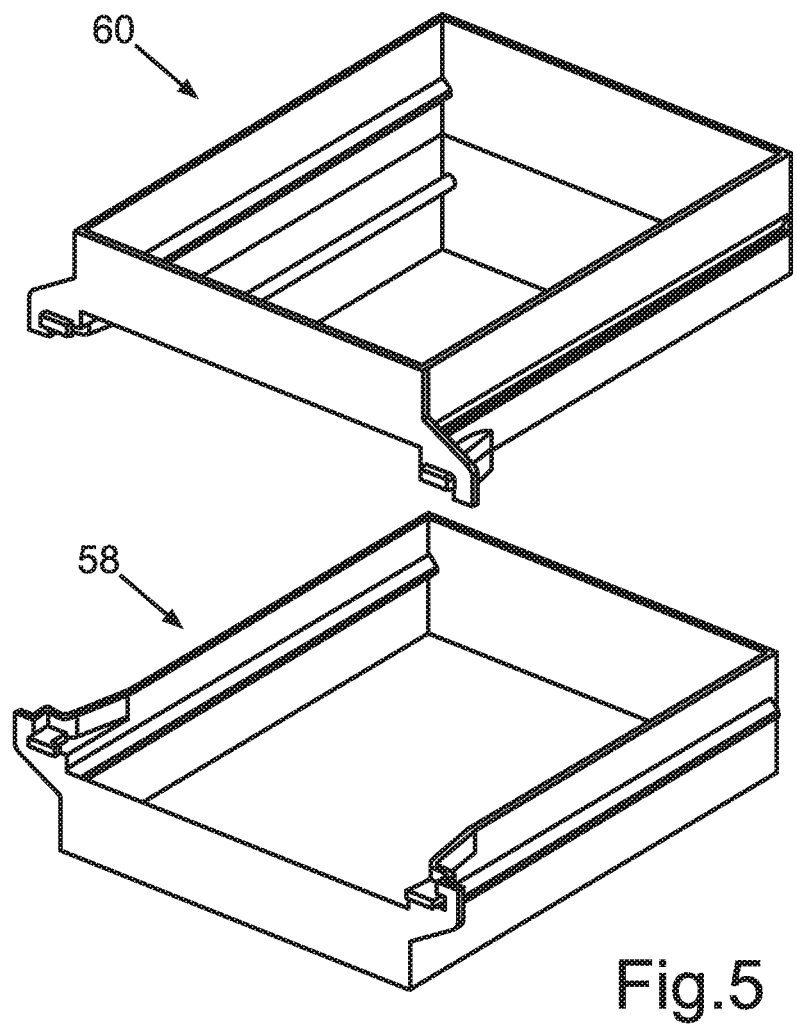
FIG. 5 is a perspective view of two housing halves, out of which the housing shown in FIG. 4 is constructed.

In FIG. 4, the housing 12 assembled out of a lower housing half or a lower housing part 58 and an upper housing half or an upper housing part 60 is shown. In FIG. 5, the upper housing part 60 and the lower housing part 58 are depicted separately from each other. By means of both housing halves 58, 60, receiving regions 62 for the holding elements 32 are formed in the assembled state of the housing parts 58, 60. In these receiving regions 62, respective latching niches 64 or locking geometries are provided by the upper housing part 60 and the lower housing part 58, the latching niches serving to receive or latch the latching geometries 56 or the latching tabs (see FIGS. 2 and 3).

Figure 6:
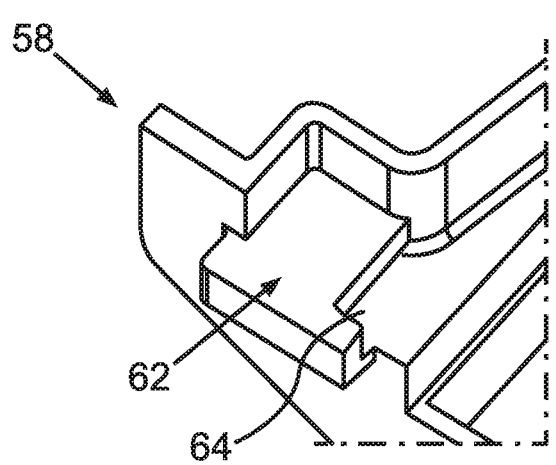
FIG. 6, in an enlarged detailed depiction, shows a portion of the lower housing half of the housing.

In FIG. 6, the latching niche 64 formed by the lower housing part 58 is shown in an enlarged perspective view. The latching niches 64 serve as counter-bearings or locks for the corresponding latching geometries 56 or latching tabs on sides of the filter element 10 which are held in a latching position of the filter element 10 by a bar-like projection of the latching niche 64.

Figure 7:
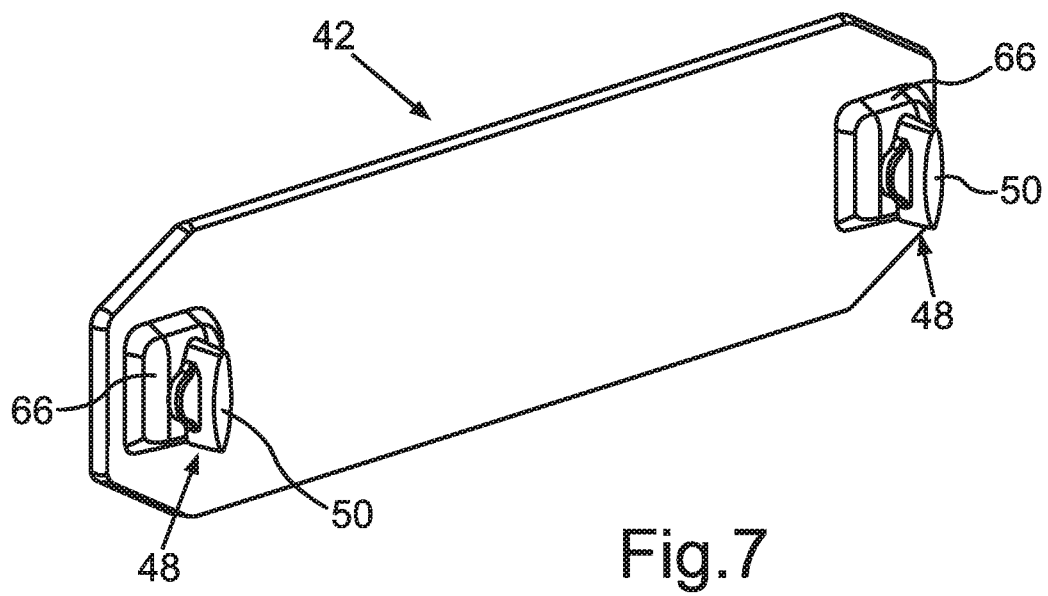
FIG. 7 shows a lid for closing the receiving chamber for the filter element according to FIG. 1 in a first perspective view.

In FIG. 7, the lid 42 is shown in a first perspective view. In the region of the locking elements 48, the lid 42 has bulges 66. Cavities 68 or receiving chambers correspond to these bulges 66, the cavities being formed on the side of the lid 42 which is facing towards the front wall 18 of the filter element 10 when the lid is mounted 42. Actuating tabs 70 protrude into these cavities 68 (see FIG. 2) when the lid 42 is fixed to the housing 12 and, correspondingly, the insertion opening 44 is closed by means of the lid (see FIG. 4). By means of these actuating tabs 70, the holding element 32 can be moved back and forth diagonally to the insertion opening 26, i.e., substantially perpendicularly to the insertion direction 26. The actuating tabs 70 thus serve to fix and demount the filter element 10. This is described in further detail with respect to FIG. 9 to 12.

Figure 9:
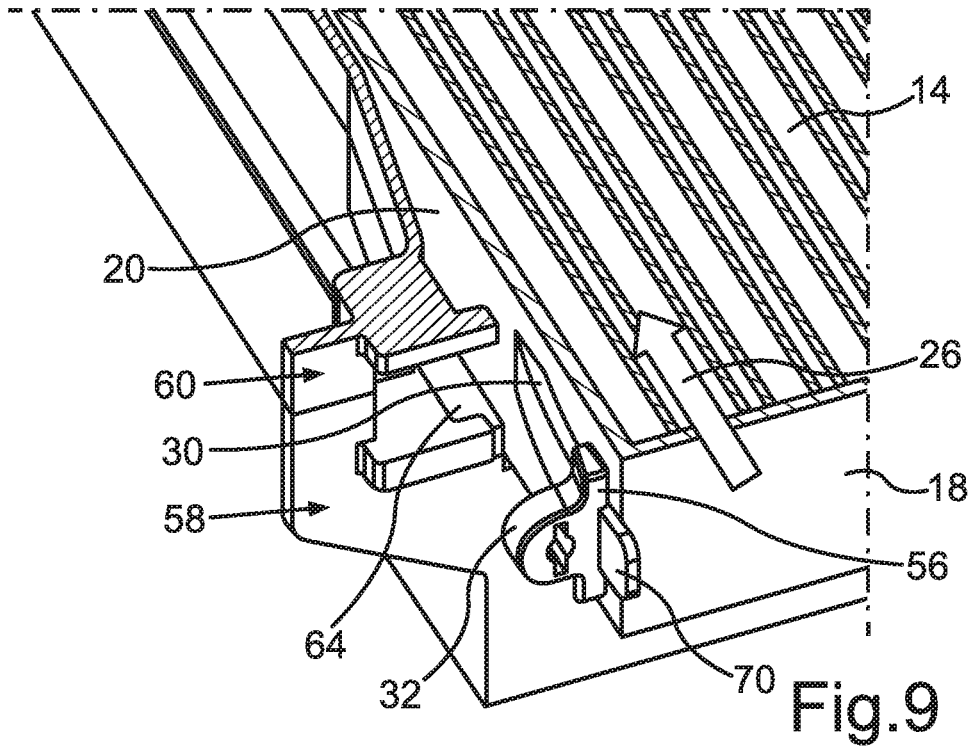
FIG. 9 shows a first step when inserting the filter element according to FIG. 1 into the filter housing according to FIG. 4.
Figure 10:
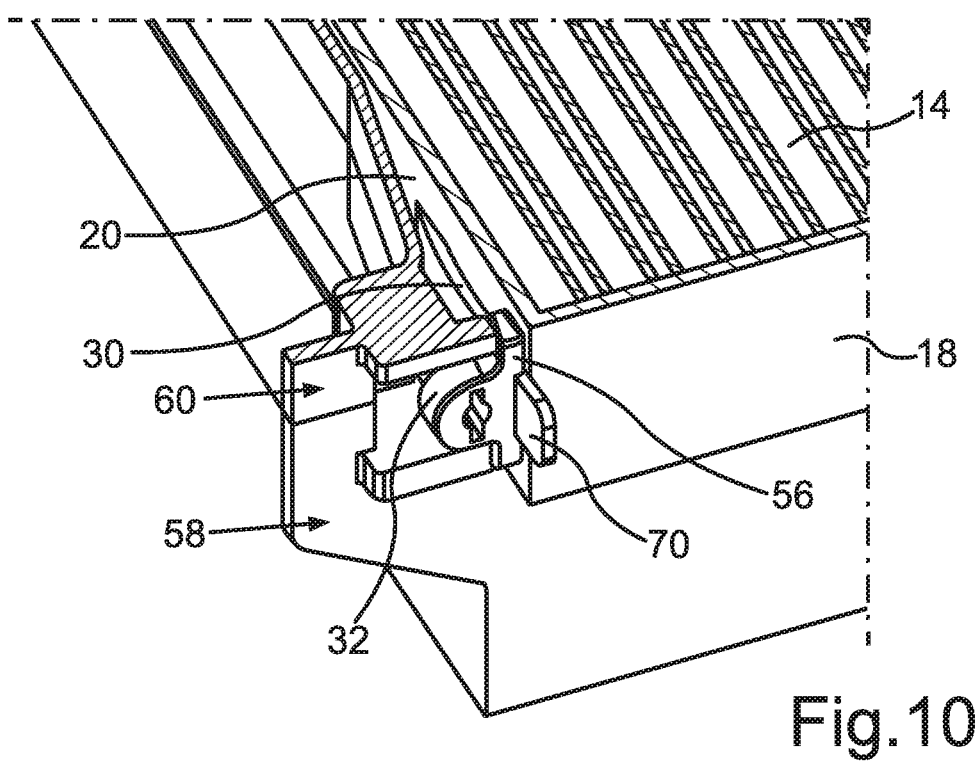
FIG. 10 shows the deformation of a bar, by means of which the holding element is held to the side wall of the frame when further inserting the filter element into the receiving chamber.
Figure 11:
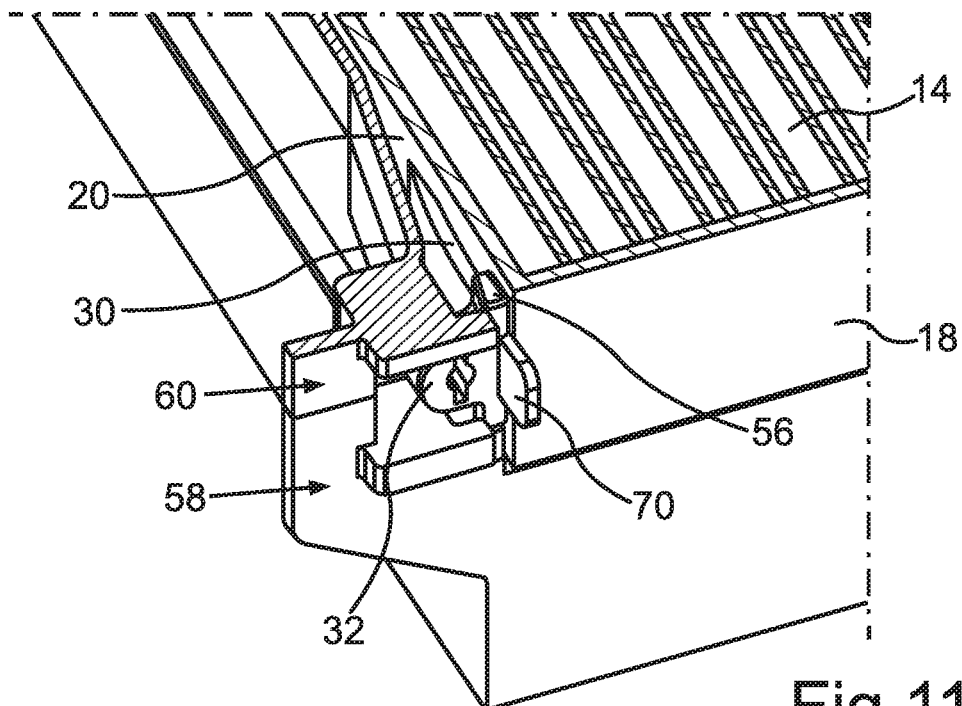
FIG. 11 shows a further step when inserting the filter element, in which the filter element which is introduced into the receiving chamber has reached its end position with respect to the insertion depth.
Figure 12:
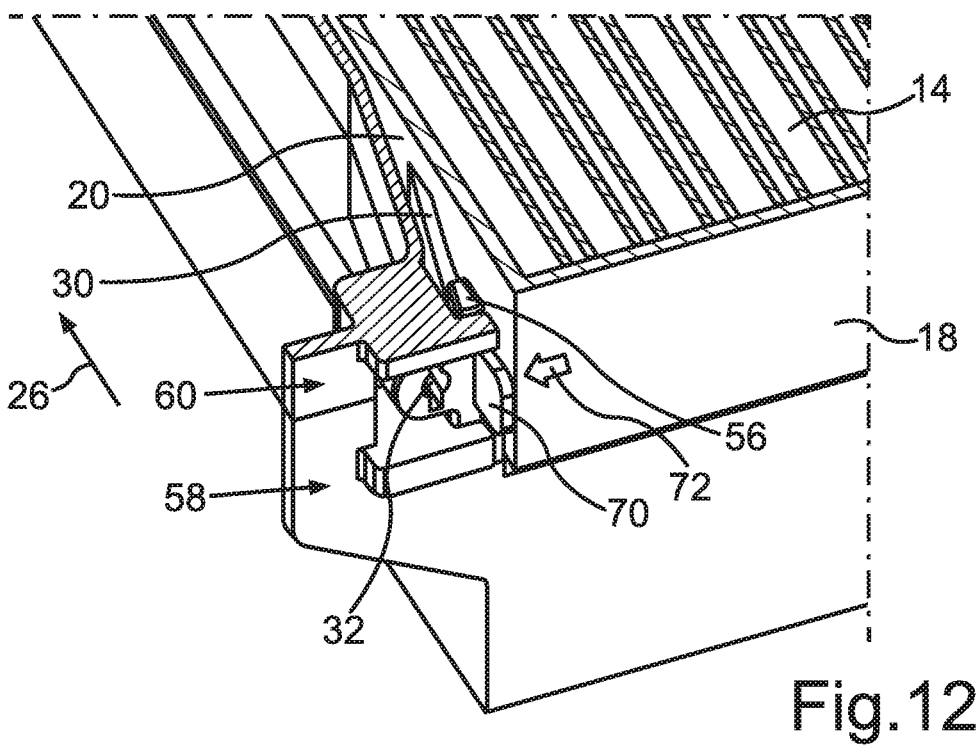
FIG. 12 shows the application of pressure onto a latching lug arranged on the holding element, whereby the holding element is moved into a latching position.

In FIG. 9, the housing part 60 and the filter element 10 are shown in a section view. Firstly, the filter element 10 is slotted into the housing 12 in the insertion direction 26. When the latching tabs or latching geometries 56, here shaped like wedges, come into contact with the edge of the filter housing 12, when further slotting in the filter element 10, the flexible bar 30 and with it the holding element 32 are moved closer towards the side wall 20 (see FIG. 10). In FIG. 1, the filter element 10 is shown in its installation position or end position, in which the latching geometries 56 are found at the height of the latching niches 64. As a result of manual pressure against the actuating tab 70 in an outwards direction, which is shown in FIG. 12 by an arrow, and/or as a result of suitable preloading of the flexible bar 30, the latching tabs 56 are introduced undercuttingly into the latching niches 64. The latching of the latching tabs 56 into the latching niches 64 is tactile and audible. As a result, an operating person who moves the holding element 32 into the latching position receives haptic and acoustic feedback that the holding element 32 has reached the latching position. Following this, the holding element 32, which serves as a receiver for the shaft 38 of the locking element 48, has reached its latching position, and the span geometry of the ramps 52 is correctly aligned such that the locking element 48 can be guided through the key-hole shaped passage opening 36, and the lid 42 can be mounted.

Figure 13:
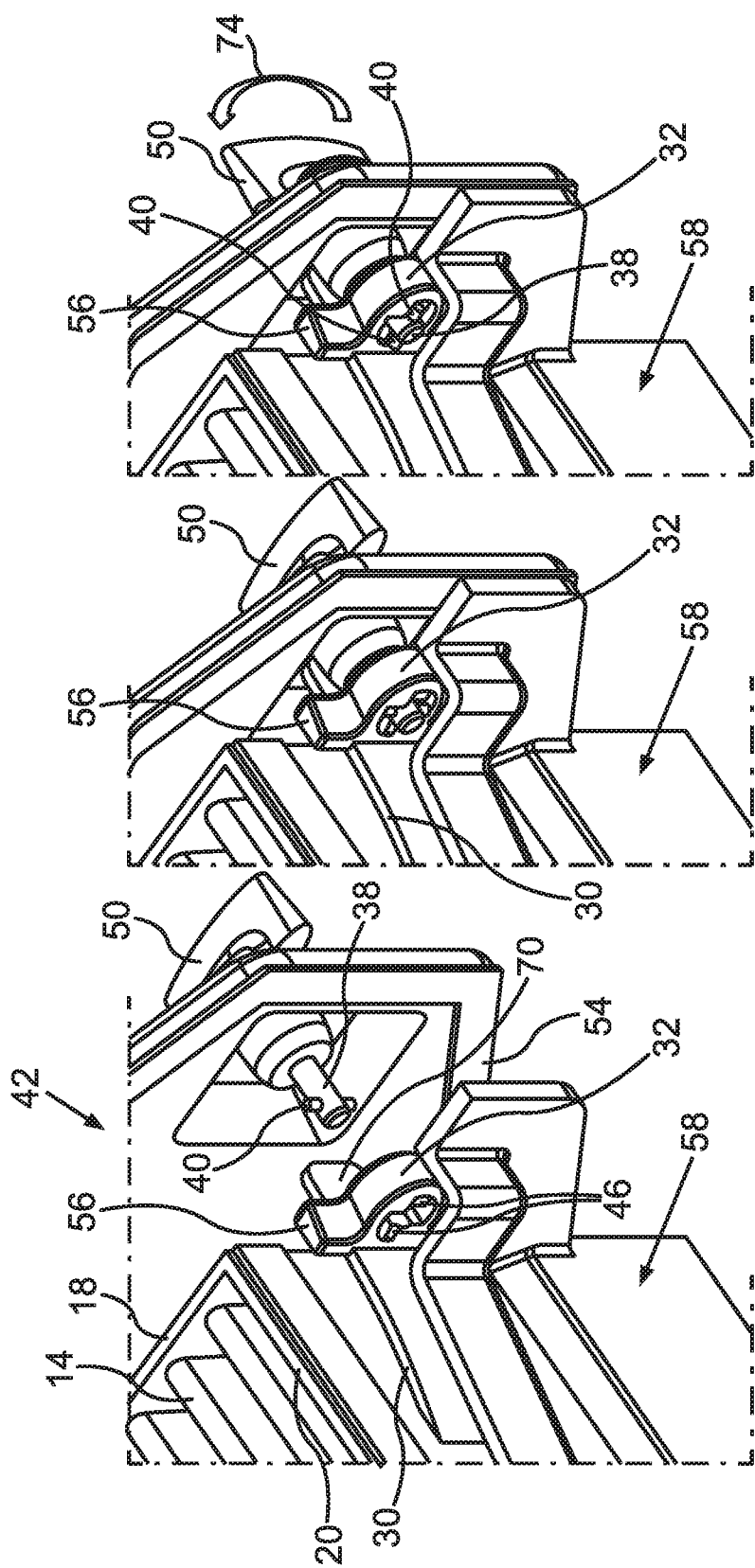
FIG. 13 shows steps when fixing the lid according to FIG. 7 to the filter housing according to FIG. 4, wherein the filter element according to FIG. 1 is introduced into the housing.

FIG. 13 shows the fixing of the lid 42 in a rear view. The section shown corresponds to the section of the housing part 60 and filter element 10 shown in FIG. 9 to 12. When the respective holding element 32 is received in the receiving region 62 and is thus moved into the latching position (see the left depiction in FIG. 13), the lid 42 can be placed on. The middle depiction in FIG. 13 shows how the bolt rods 40 are slotted through the passage opening 36, such that the bolt rods 40 are found at the height of the ramp 52 (see FIG. 3). For this purpose, the shaft 38 is guided through the passage opening 36.

The bolt rods 40, here in the form of spigots, which project perpendicularly from the end of the shaft 38, and the shaft 38 or bolts of the locking element 48 fit into the receiving geometry provided by the holding element 32. Following this, by means of the handle part 50, the locking element 48 or the shaft 38 is rotated with the bolt rods 40. A corresponding rotational movement is illustrated in the right depiction in FIG. 13 by a further arrow 74. By actuating the locking element 48, the lid is pulled into a tight seal against the filter housing until the bolt rods 40 abut on the abutments 46 (see FIG. 3) of the holding element 32.

Figure 14:
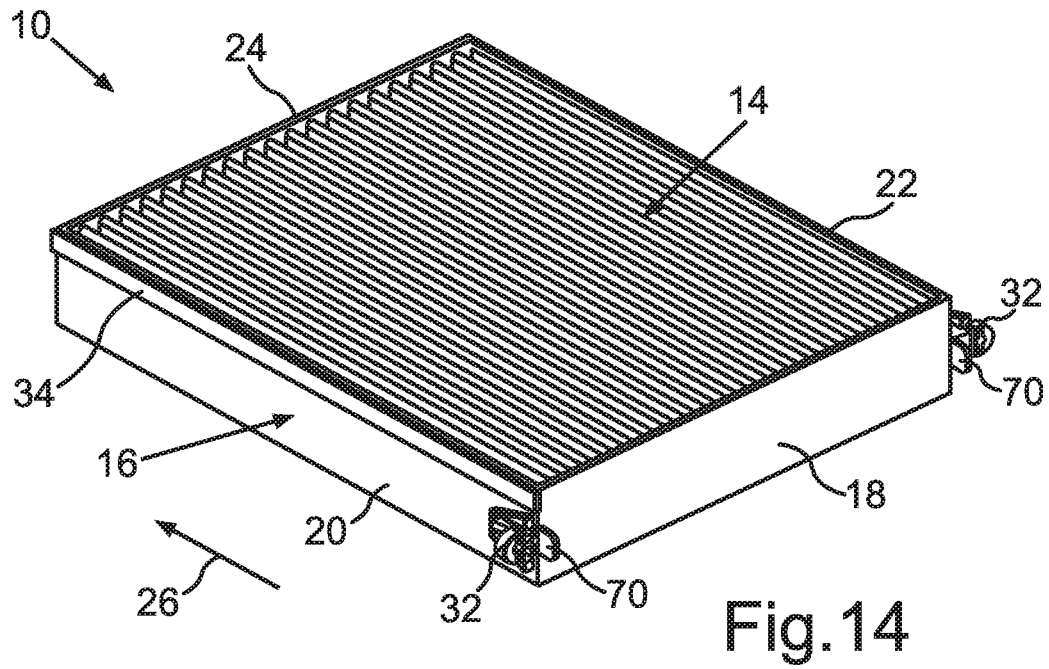
FIG. 14 shows a variant of the filter element in which a front wall of the frame is formed to be elastically deformable, wherein the at least one holding element is connected to a support element, on which two resilient arms are arranged.

FIG. 14 shows a variant of the filter element 10 in which the front wall 18 of the frame 16 is designed to be elastically deformable. Otherwise, the frame 16 corresponds to the variant of the filter element 10 outlined with respect to FIG. 1. The filter element 10 also has the holding elements 32 described above. However, the holding elements 32 are connected to the respective side wall 20, 22 adjacent to the front wall 18 via a rigid connecting bar 76. This connecting bar 76 lies here in continuation with the plane formed by the front wall 18 of in other words, it is flush with the front wall 18.

Figure 16:
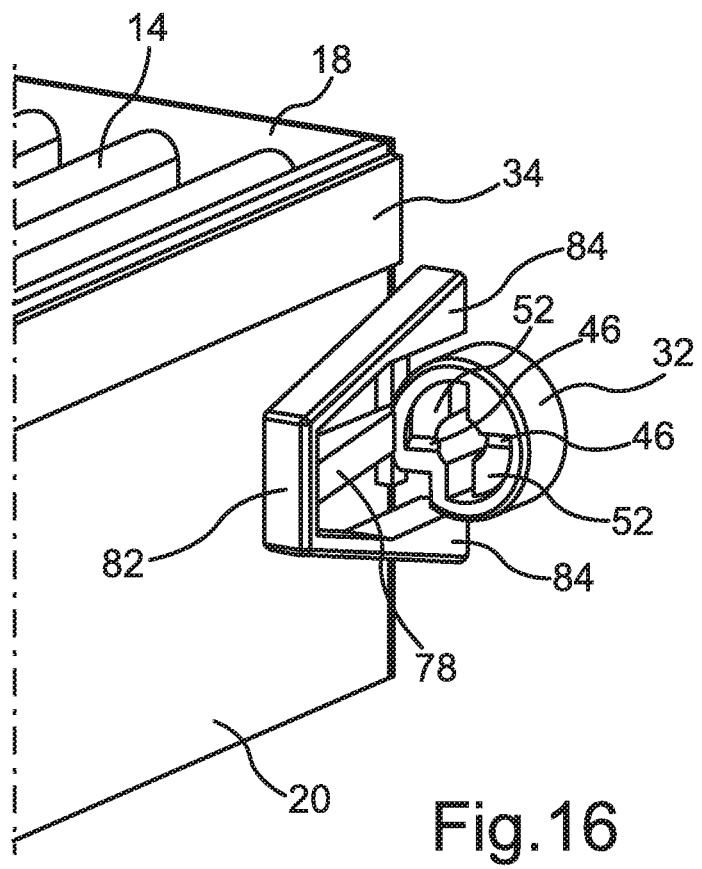
FIG. 16 shows a further enlarged detailed view of the filter element according to FIG. 14 in the region of the holding element.
Figure 17:
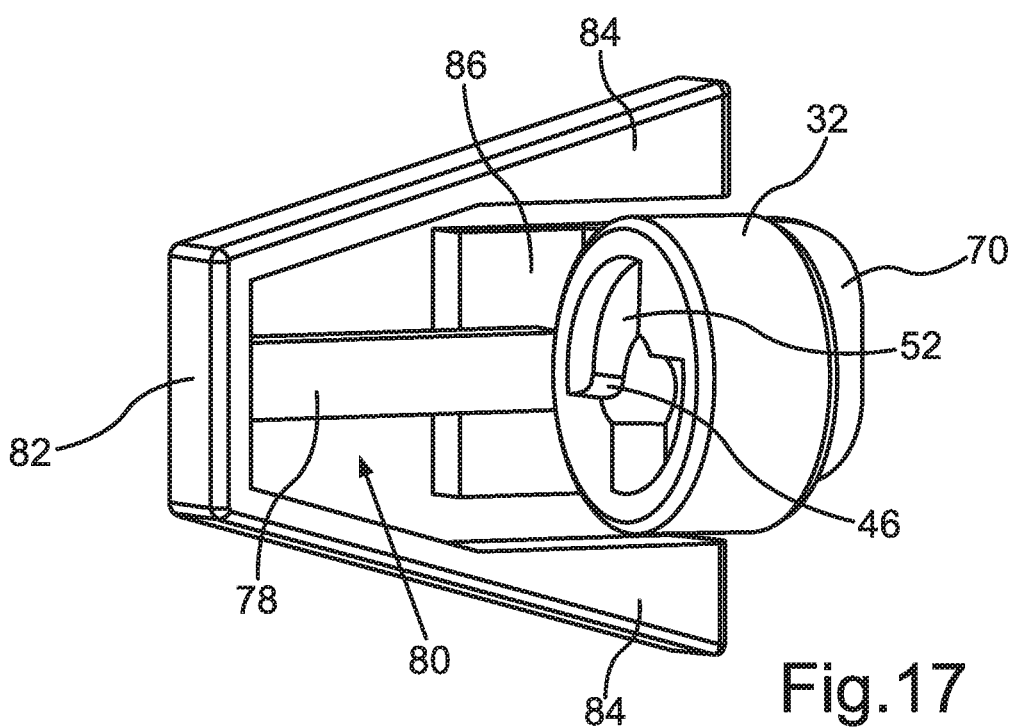
FIG. 17 shows a further perspective view of the holding element according to FIG. 16.

A first rod 78 of a carrier element 80 extends backwards from the holding element 32, which has the passage openings 36 for the shaft 38 having the bolt rods 40 (see FIG. 8), in the insertion direction 26. On a second rod 82 of the T-shaped carrier element 80, two resiliently formed arms 84 are arranged (see FIG. 5). From FIG. 16, it is clear that the holding element 32 in turn has the abutments 46 for the bolt rods 40 (see FIG. 8) and the ramps 52. The abutments 46 and the ramps 52 of the holding element 32 can also be recognised easily from the depiction in FIG. 17, in which a connection region 86 is also shown in which the connection to the frame 16 is produced.

Figure 15:
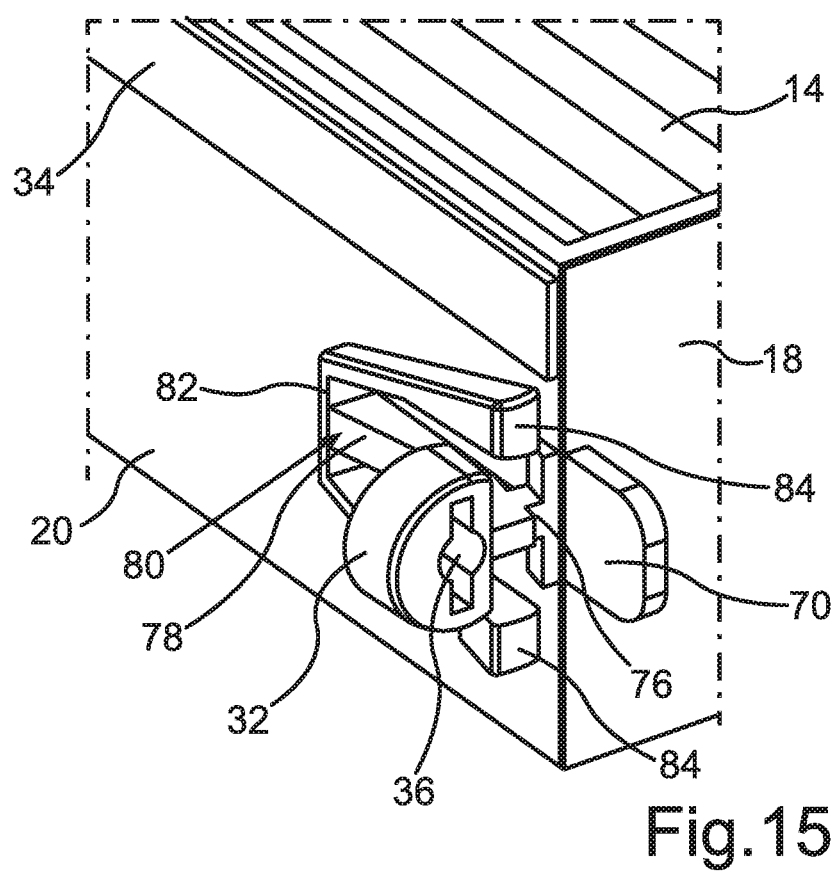
FIG. 15 shows the filter element according to FIG. 14 in the region of the holding element in an enlarged detailed view.

The holding elements 32 of the filter element 10 according to FIG. 15 also have the span geometry of the locking arrangement. In this variant of the filter element 10, the flexible arms 84 serve as latching geometry for the latching niches 64 provided in the filter housing 12 (see FIG. 18). In particular, it is visible from the section view in FIG. 19 how the latching niches 64 are provided for latching with the arms 84 by means of bar-like projections 88, 90 which are provided on sides of the housing.

Figure 18:
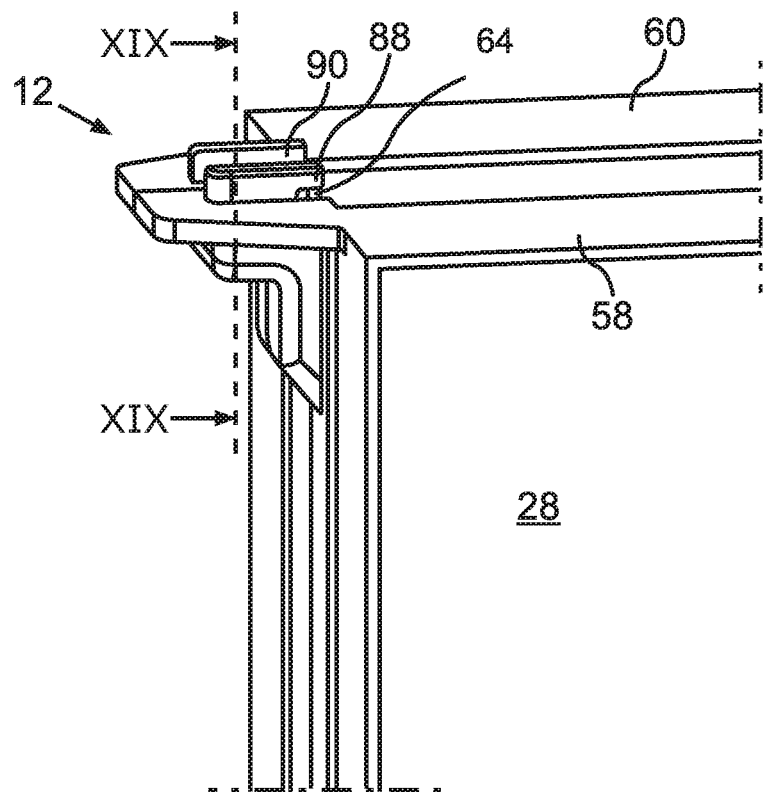
FIG. 18 shows in part, the two housing halves of the housing of the air filter into which the filter element according to FIG. 14 can be introduced.
Figure 19:
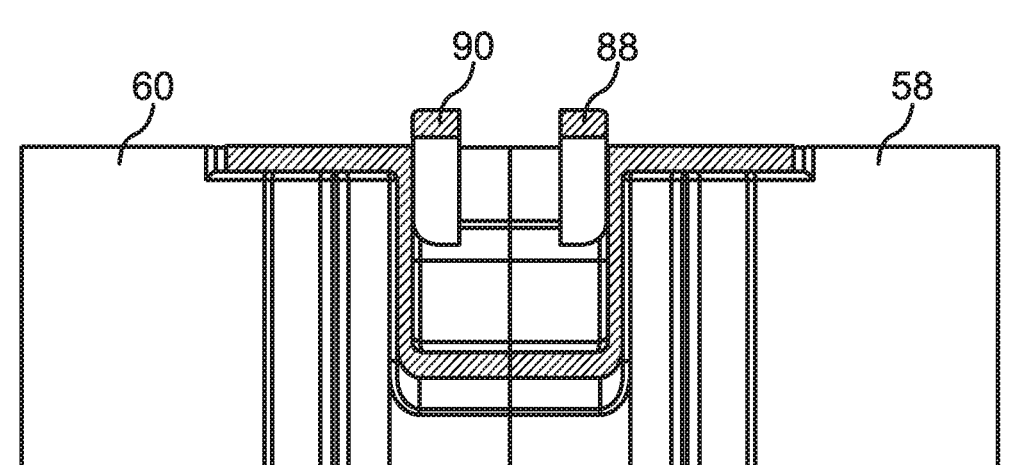
FIG. 19 shows a cross-section along a line XIX-XIX in FIG. 18.
Figure 20:
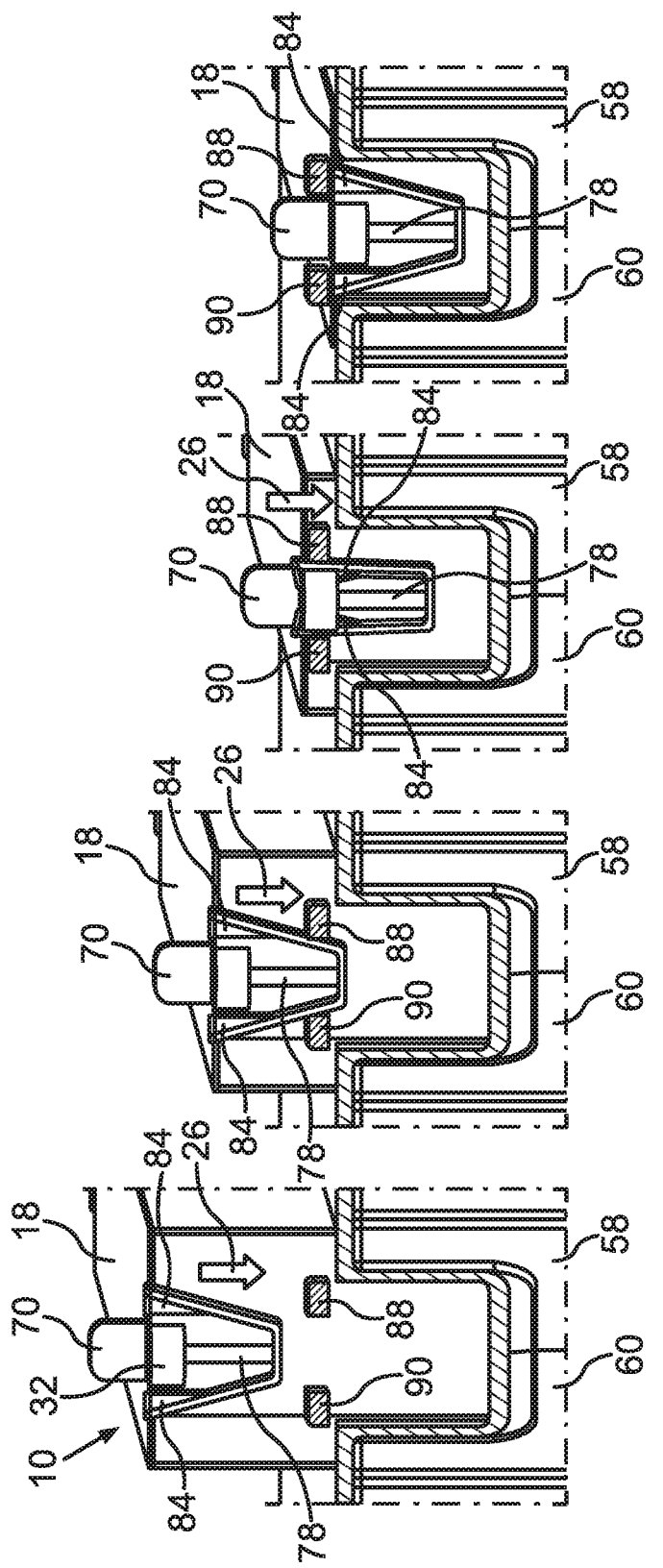
FIG. 20 shows steps when inserting the filter element according to FIG. 14 into the housing according to FIG. 18 in a side view.

The fixing of the filter element according to FIG. 14 in the housing 12 according to FIG. 18 shall be illustrated through the use of FIG. 20. Firstly, the filter element 10 is inserted into the housing 12 (see FIG. 20, left depiction). The flexible arms 84 come in contact with the bar-like projections 88, 90 on the housing 12—or on the housing halves 58 and 60—and are moved, upon further slotting in the insertion direction 26, in the direction of the first bar 78 of the carrier element 80 (see FIG. 20, second depiction on the left). The flexible arms 84 here deform elastically on the bars 88, 90 (see FIG. 20, second depiction on the right). When the filter element 10 has reached its end position, the arms 84—now behind the bars 88, 90—spring back into their initial position (see FIG. 20, right depiction). The latching geometries in the form of the arms 84 now block the removal of the filter element 10 from the receiving chamber (see FIG. 18) against the insertion direction 26.

Figure 21:
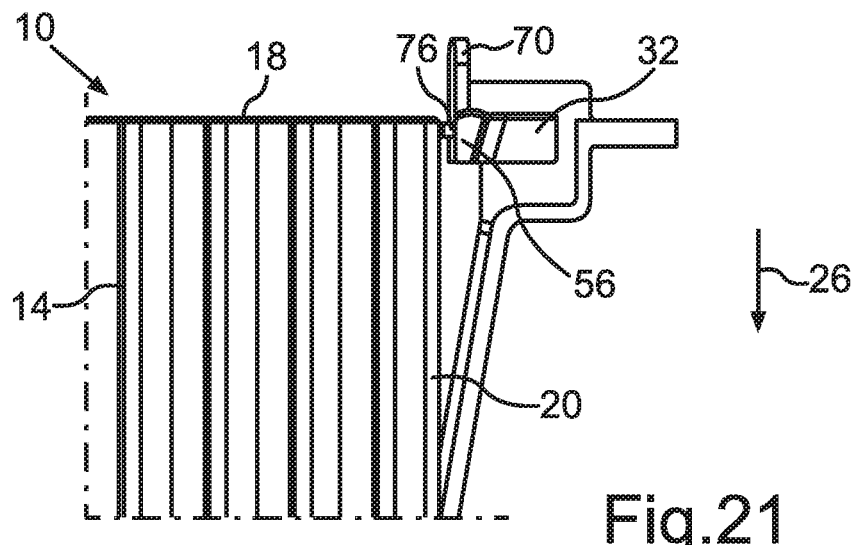
FIG. 21, in part, shows a further variant of the filter element with a flexible front wall.
Figure 22:
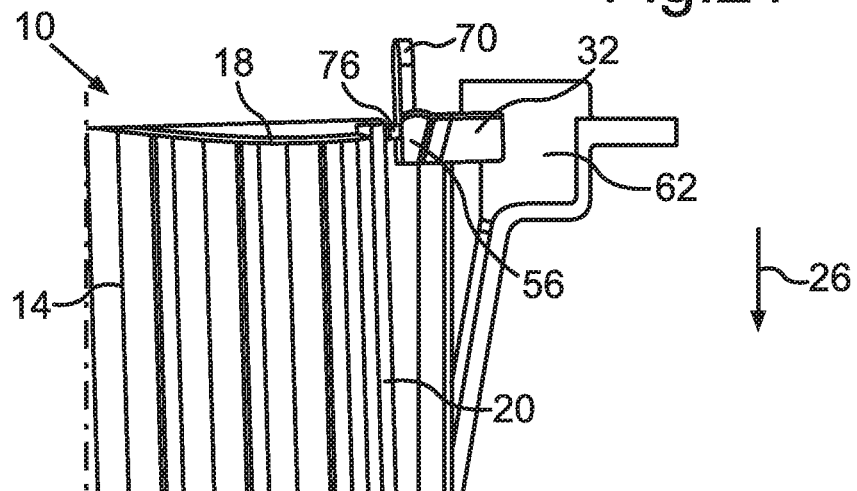
FIG. 22 shows the movement out of one of the holding elements of the filter element according to FIG. 21 from the latching position by deforming the front wall.
Figure 23:
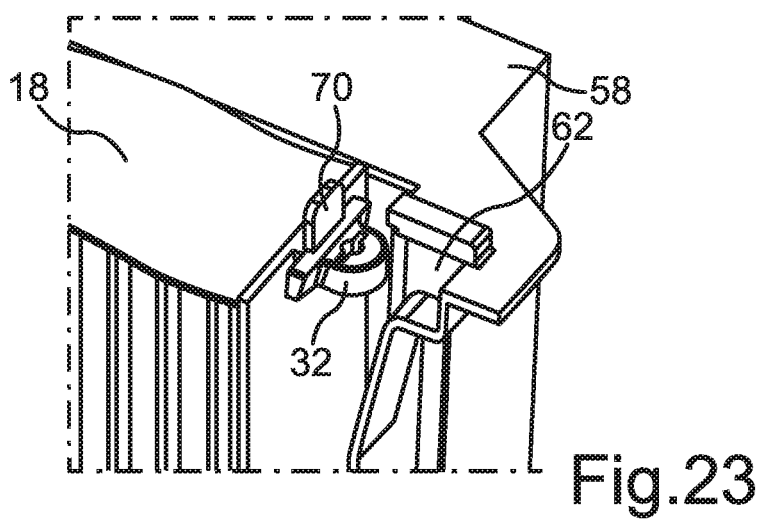
FIG. 23 shows in a perspective view, the movement of the holding element into the demounting position, in which the filter element according to FIG. 21 can be removed from the receiving chamber of the housing according to FIG. 18.

In FIG. 21 to 23, a further variant of the filter element 10 is shown, wherein the demounting is illustrated using a progressive image sequence. The method of the demounting here also corresponds to the demounting of a filter element 10 as is depicted according to FIG. 14. In the variant of the filter element 10 shown in FIG. 14 as well as in the variant of the filter element 10 according to FIG. 21, the movement back and forth of the holding elements 32 from the latching position into the demounting position—and also vice-versa—occurs by means of an elastically deformable or flexible front wall 18.

In the filter element 10 shown in FIG. 21, instead of the resilient arms 84, rigid latching tabs are provided as latching geometries 56, which lock the filter element 10 in its end position against a removal out of the receiving chamber 28. However, the holding elements 32 are not fixed by means of the flexible bar 30 to the respective side wall 20, but rather via a rigid connecting bar 76 which is also described with reference to FIG. 14 and FIG. 15. In FIG. 21, the holding element 32 is found in the latching position in which the locking element 48 (see FIG. 7 and FIG. 8) can be fixed to the holding element 32.

By exerting a pressure against the actuating tab 70 transversely to the insertion direction 26 and inwards in the direction of the filter element 10, the flexible front wall 18 gives in, whereby the holding element 32 which is provided on sides of the housing 12 (see FIG. 4) can be moved out of the receiving region 62. In particular, it is clear from FIG. 23 that by exerting pressure against the actuating tab 70 onto the filter element 10 inwards, the front wall 18 can be deformed to such an extent that the filter element 10 can be removed from the receiving chamber 28 against the insertion direction 26.

Figure 24:
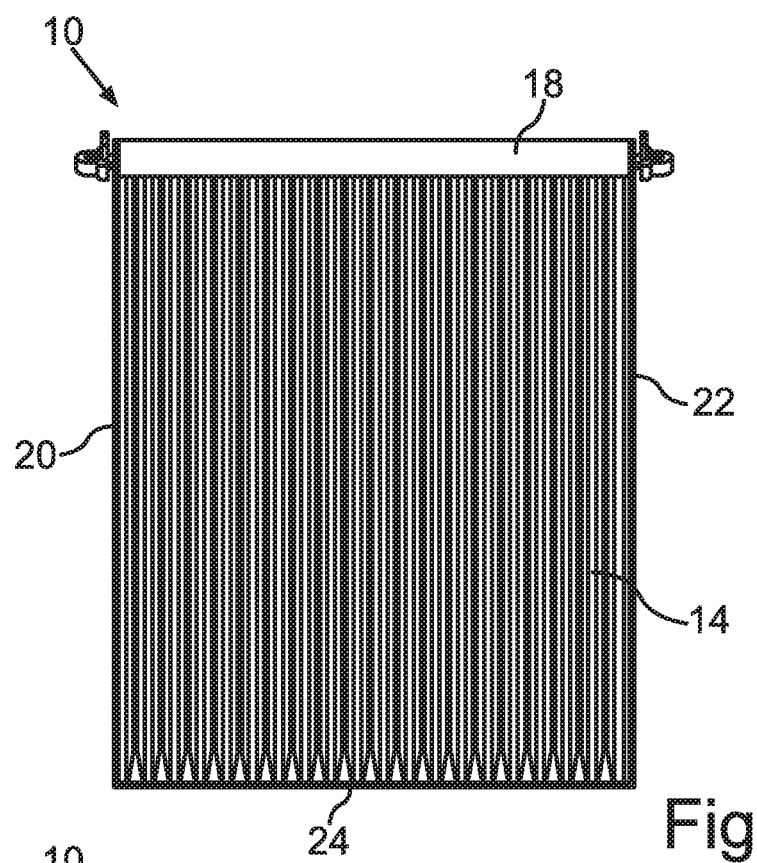
FIG. 24 shows a further view of the filter element according to FIG. 21 with a front wall that, as yet, has not been deformed.
Figure 25:
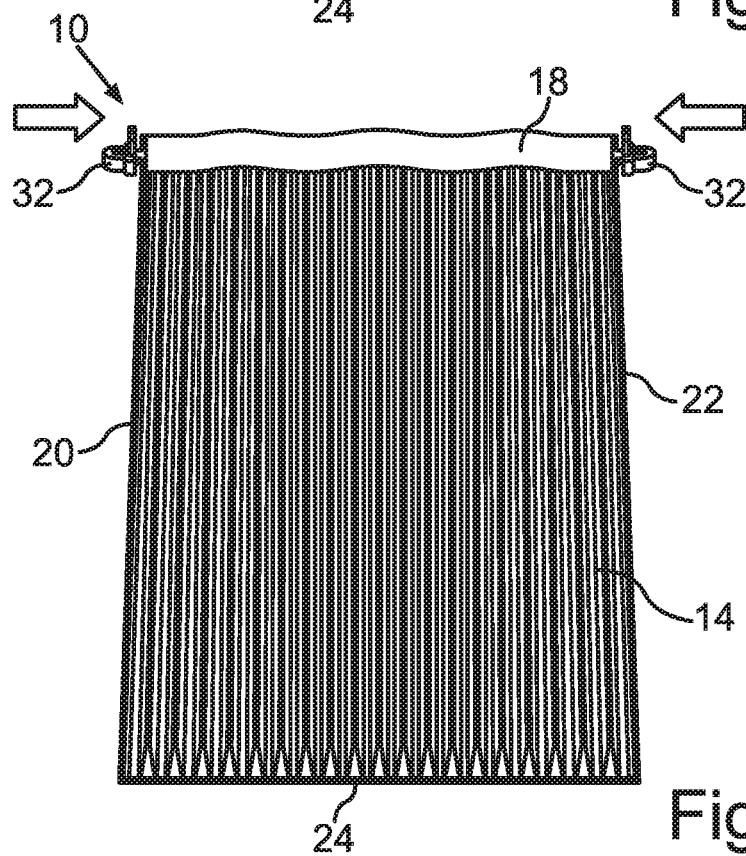
FIG. 25 shows the compression of the filter element in the region of the front wall and the bringing of the holding element into the demounting position effectuated thereby.

FIG. 24 shows a variant of the filter element 10 according to FIG. 21 with two holding elements 32 on both sides of the front wall 18 and with the as yet undeformed front wall 18. In FIG. 25, arrows 92 illustrate the compression of the filter element 10 in the region of the elastically deformable front wall 18, by means of which the holding elements 32 can be moved out of the receiving regions 62. The demounting position is therefore achieved by compressing or moving the actuating tabs 70 of the flexible front wall 18 of the filter element 10 towards each other. In particular, as a result of a rigid or stiff connection of the holding elements 32 to the side wall 20, 22, the force to be applied for deforming the front wall can be introduced particularly well.

By means of FIG. 25, it can be recognized particularly well that a radius, along which the latching geometry 56 can be moved when latching or unlatching, in an embodiment of the filter element 10 with a flexible front wall—in comparison to the embodiment with the flexible bars according to FIG. 3, is very large by the radius length corresponding to the entire length of the side wall 20, 22. In this way, the curvature of the locking geometry of the latching niche 64 on sides of the housing 12 which is necessary for latching or unlatching the locking geometry 56 (see FIG. 6, the indentation of the rod-shaped projection of the latching niche 64) can be designed flatter than in the solution with the shorter flexible rods 30. This accompanies a simplification of the constructive requirements of the production of the latching niches 64, 88, 90 on sides of the housing.

Figure 26:
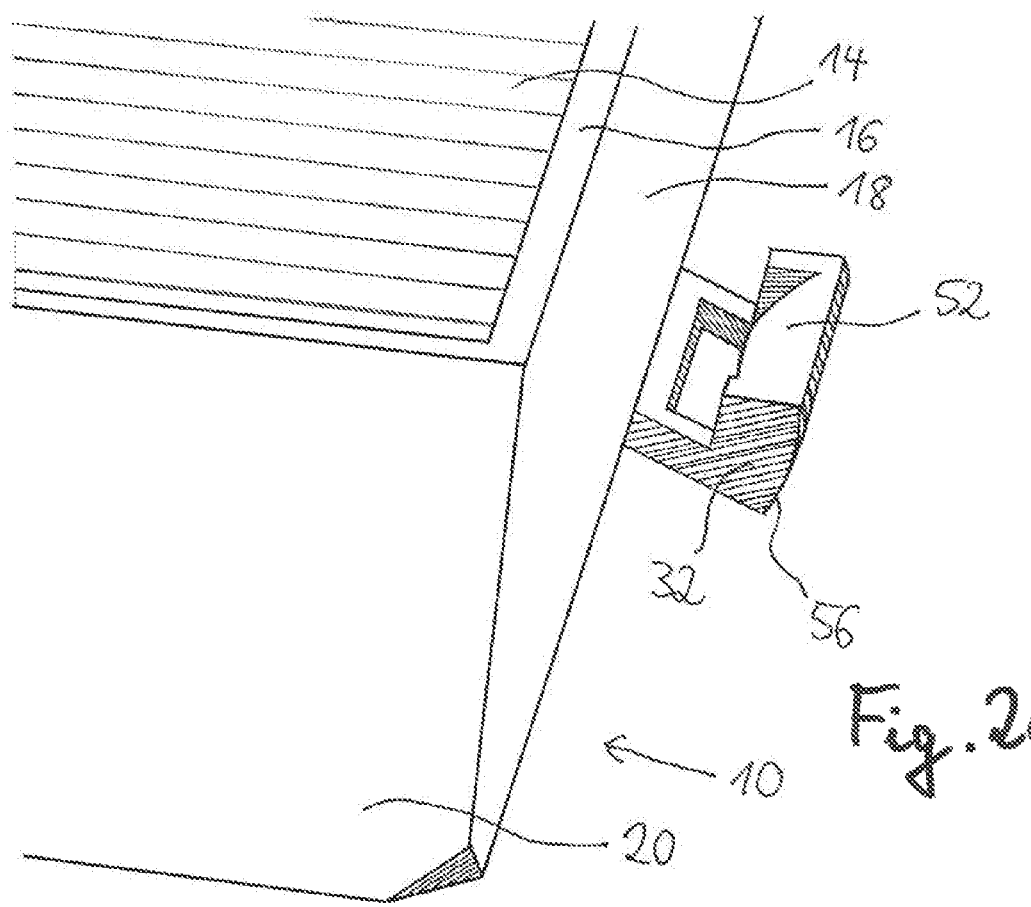
FIG. 26 shows in part and perspectively, a further variant of the filter element, in which the holding element is attached to the lower end in the middle of the front wall.

FIG. 26 to 29 illustrate a further embodiment of the filter element 10 according to the invention or the connection arrangement according to the invention. FIG. 26 shows the holding element 32 attached centrally to the lower edge of the front wall 18 of the filter element 10. The holding element 32 has an angular shape, wherein the surface facing downwards or the lower section of the holding element functions as a latching geometry 56 for a latching niche in the housing 12. The filter element 10 is fixed to this latching geometry 56 in the housing 12.

Figure 27:
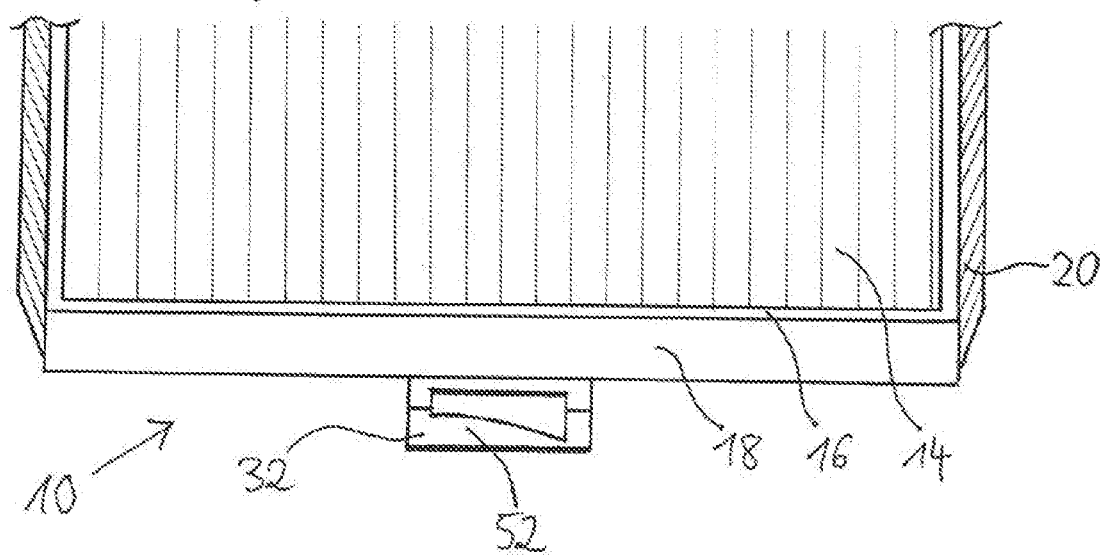
FIG. 27 shows a cut-out of the filter element according to FIG. 26 seen diagonally from above.
Figure 28:
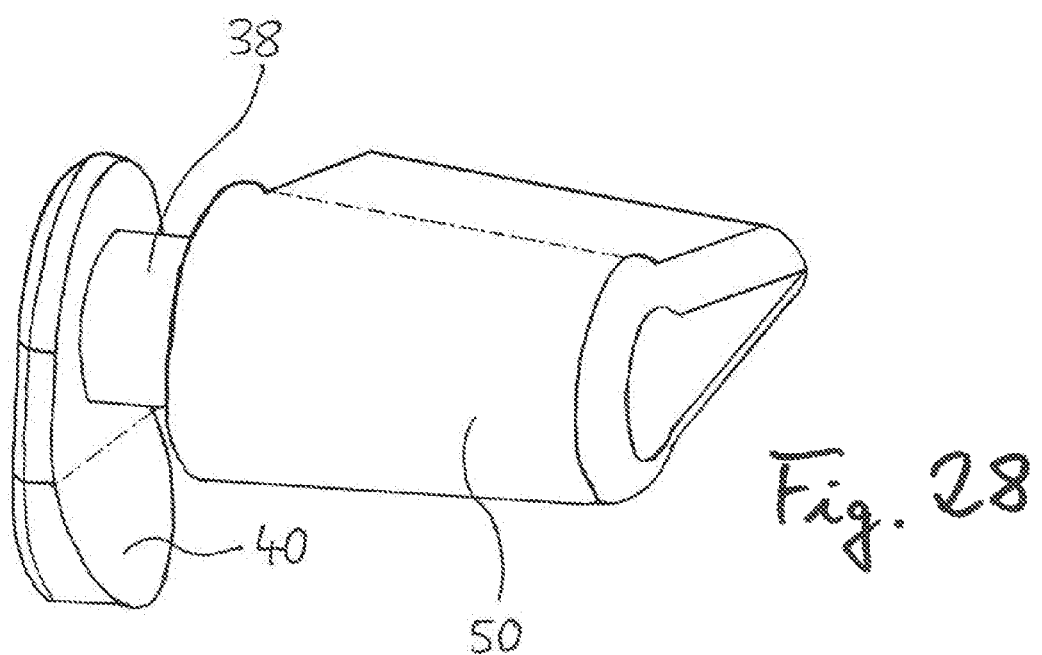
FIG. 28 shows, in a side view, a locking element for this variant of the filter element.

As shown in FIGS. 26 and 27, the holding element 32 has a ramp 52 as a contact surface for the bolt rod 40 of the locking element 48. The bolt rod 40, here in the form of a tab, can, as depicted in FIGS. 28 and 29, incline inwardly on its free end—in the direction of the shaft. In this way, by interacting with a corresponding opposing geometry of the ramp 52 on the holding element 32, which is then designed in a bow shape or also in a frusto-conical shape, it is achieved that the bolt rod 40 is not only secured in the operating position in a pull direction against the lid, but also in a direction inclined towards it, whereby the connection is additionally secured, for example, against vibrations.

FIG. 29 shows the locking element 48 in a state between an unlocking and a locking position. For a complete locking, the bolt rod 40—or here, locking tab—must be guided by means of the handle part 50 clockwise over the ramp 52. Here, the distance between the underside of the locking tab 40 and the ramp 52 is represented enlarged for the sake of clarity. For the same reason, the engagement of the lid 42 and the housing 12 is only represented schematically in the upper part of the figure.

The invention claimed is:

1. A connection arrangement that fixes a lid (42) to a filter housing (12) of an air filter device of a motor vehicle and to a filter element (10) via which an insertion opening (44) in the filter housing (12) for the filter element (10) is closeable with the lid (42), comprising:
   a holding element (32) on the filter element (10); and
   a locking element (48) on the lid (42);
   wherein the holding element (32) is fixable by a contact surface for contacting the locking element (48) protruding from the lid (42) in a recess of the filter housing (12);
   wherein the holding element (32) has a latching geometry (56) with which the holding element (32) is latchable in the recess of the filter housing (12) formed as a latching niche (64), whereby the filter element (10) is fixable in a latching position to the filter housing (12);
   wherein the locking element (48) is formed as a shaft (38) having a bolt rod (40) projecting from a first end of the shaft (38) and having a handle part (50) on a second end of the shaft (38) for rotating the locking element (48), wherein the bolt rod (40) projects from the first end of the shaft (38) along a direction perpendicular to a long axis of the shaft (38);
   wherein the shaft (38) is guided through the lid (42) such that the lid (42) and the filter element (10) in a latching position are, by the bolt rod (40) and the contact surface formed as a ramp (52) on the holding element (32), which engage with one another by turning the locking element (48), spannable against each other.

2. A filter element (10) comprising the holding element (32) of the connection arrangement according to claim 1, wherein the holding element (32) is held on a frame (16) which at least regionally surrounds a filter material (14) of the filter element (10).

3. The filter element (10) according to claim 2, wherein the ramp (52) on the holding element (32) is formed as a three-dimensional hump.

4. The filter element (10) according to claim 2, wherein the holding element (32) has a passage opening (36) for guiding the locking element (48) through, wherein the ramp (52) is formed on a back side of the passage opening (36).

5. The filter element (10) according to claim 2, wherein the holding element (32), abutting on the ramp (52), has an abutment (46) for securing an end position of the bolt rod (40).

6. The filter element (10) according to claim 2, wherein the holding element (32) is held by a flexible connecting bar (30) to the frame (16).

7. The filter element (10) according to claim 2, the filter element (10) has an elastic front wall (18) is deformable from an expanded shape into a compressed shape.

8. The filter element (10) according to claim 2, wherein the filter element (10) has an actuating element (70), with which the latching geometry (56) of the holding element (32) is movable out of the latching position of the filter element (10) into a demounting position.

\* \* \* \* \*